United States Patent
Tran

[19]

[11] Patent Number: 5,461,571
[45] Date of Patent: Oct. 24, 1995

[54] COMPLEMENTARY THREAD DISPLAY METHOD AND APPARATUS

[75] Inventor: My Tran, Albuquerque, N.M.

[73] Assignee: Honeywell Inc., Minneapolis, Minn.

[21] Appl. No.: 977,375

[22] Filed: Nov. 17, 1992

[51] Int. Cl.$^6$ .................................................. G01S 7/40
[52] U.S. Cl. ...................... 364/423; 364/424.01; 434/2
[58] Field of Search ............................ 364/423, 461, 364/443, 456, 200; 342/5, 417, 182, 195, 45, 13, 14, 17; 340/973; 434/2

[56] References Cited

U.S. PATENT DOCUMENTS

| | | | |
|---|---|---|---|
| 4,196,474 | 4/1980 | Buchanan et al. | 364/461 |
| 4,224,619 | 9/1980 | Bean et al. | 343/5 |
| 4,424,038 | 1/1984 | Tingleff et al. | 434/2 |
| 4,602,336 | 7/1986 | Brown | 364/456 |
| 4,658,354 | 4/1987 | Nukiyama | 364/200 |
| 4,823,271 | 4/1989 | Clark et al. | 364/443 |
| 4,845,495 | 7/1989 | Bollard et al. | 340/973 |
| 4,876,545 | 10/1989 | Carlson et al. | 342/14 |
| 4,959,015 | 9/1990 | Rasinski et al. | 434/2 |
| 5,122,801 | 6/1992 | Hughes | 342/13 |

*Primary Examiner*—Mark R. Powell
*Assistant Examiner*—Steven P. Sax
*Attorney, Agent, or Firm*—Craig J. Lervick; Ronald E. Champion

[57] ABSTRACT

A complementary threat display where threat data provided by a pulsed radar jammer and a continuous wave radar jammer are correlated with the threat data provided by a radar warning receiver. The correlation identifies common threats seen by both sensors and the current jamming status of some threats. Threats that are unique to the pulsed radar jammer are displayed as complementary threats.

14 Claims, 6 Drawing Sheets

COMPLEMENTARY THREAD DISPLAY METHOD AND APPARATUS

UNITED STATES GOVERNMENT RIGHTS

The United States Government has acquired certain rights in this invention through government Contract No. DAA B07-87-C-H041 awarded by the Department of the Army.

BACKGROUND OF THE INVENTION

1. Field of the Invention

The invention relates to an aircraft survivability equipment system and more particularly to a method and apparatus to display complimentary threats.

2. Discussion of the Prior Art

In the prior art, individual aircraft survivability equipment (ASE) sensors are used as stand alone systems. The use of such systems in a stand alone manner results in high pilot workloads. Further, in such systems only a limited amount of threat data is presented to the pilot. Data provided by various ASE subsystems such as pulsed radar jammers, CW radar jammers and missile approach detectors have previously not been used to provide a comprehensive and coherent picture of the threat environment. Thus prior art systems often do not present adequate data in a readily understood format to enable the pilot to quickly and completely assess a given threat environment.

Earlier version ASE displays only showed the status of jamming or receiving from the Pulsed Radar Jammer and the threats from the Radar Warning Receiver. However, with the bus compatible version of this sensor, threat files are provided. It is the motive of the invention to display the unique and uncorrelated threats as "complementary" threats to the threats of Radar Warning Receiver.

SUMMARY OF THE INVENTION

The invention provides complementary threat display on a multifunction display. Threat data provided by a pulsed radar jammer is correlated with the threat data provided by a radar warning receiver. The correlation identifies common threats seen by both sensors. Threats that are unique to the pulsed radar jammer and continuous wave radar jammer are displayed as complementary threats. This improves situation awareness in an aircraft cockpit and increases the likelihood that the aircraft will survive.

DETAILED DESCRIPTION OF THE PREFERRED EMBODIMENT

Figure 1:
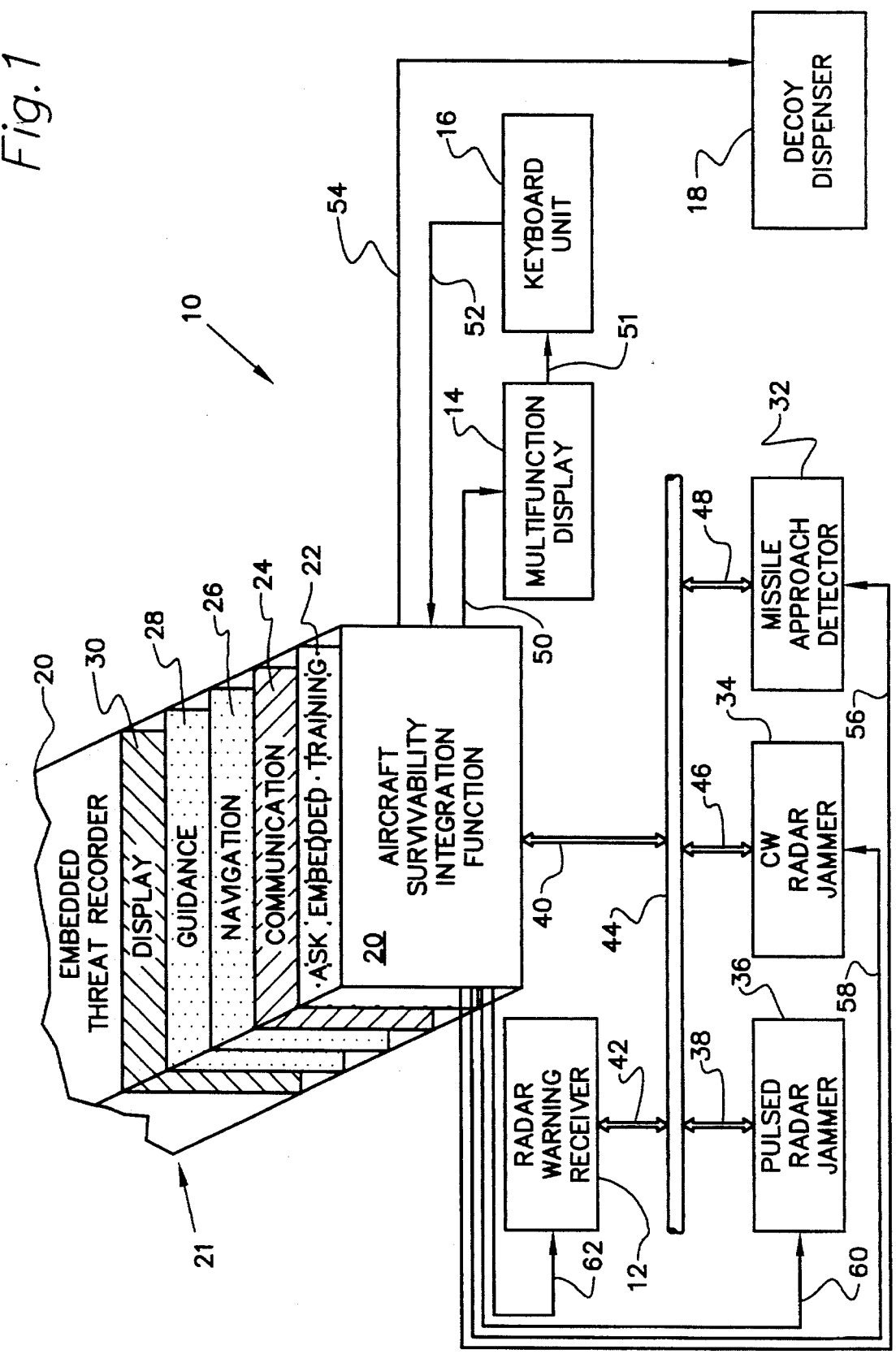
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a pulsed radar jammer 36, a radar warning receiver 12, a keyboard unit 16, a continuous wave (CW) radar jammer 34, a missile approach detector 32 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with each other and the aircraft survivability integration functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, and the CW radar jammer 34 communicates to the data bus by communication lines 46, and missile approach detector 32 communicates with the data bus through communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver may be wired by lines 62 into the aircraft survivability integration function 20, the pulsed radar jammer by lines 60, the CW radar jammer by lines 58 the missile approach detector by lines 56 and the CW radar jammer 34 by lines 58. Hard wire and bus interfaces are typically provided with such ASE devices as are conventionally available.

The multifunction display 14 is controlled by the display apparatus 30 and is wired to the display apparatus 30 in the aircraft survivability integration function 20 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integrated functions 21 to the decoy dispenser 18.

Figure 2:
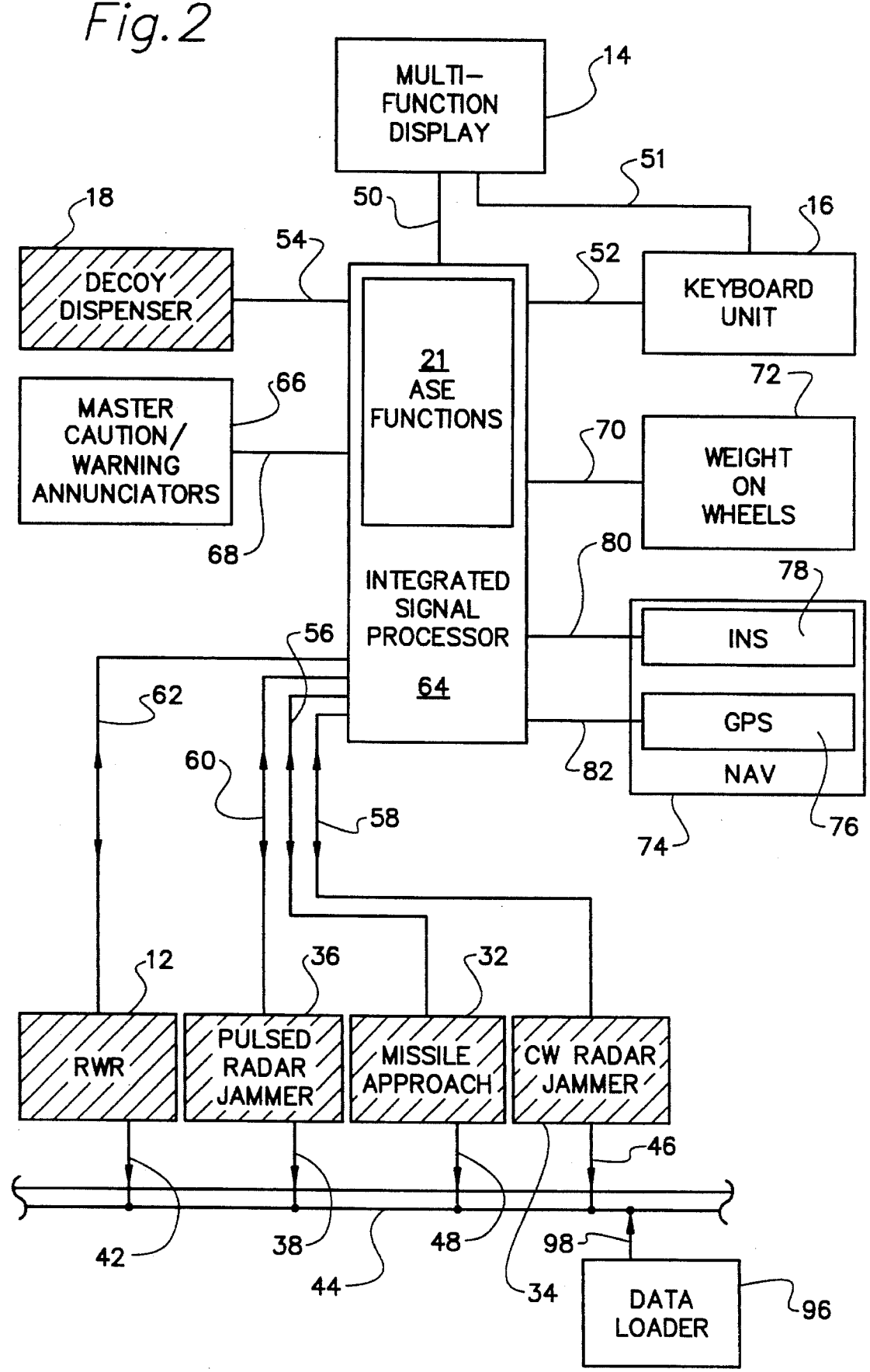
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/avionics control system (ASE/ACS). The aircraft survivability equipment/avionics control system is used to integrate control and display of an ASE suite of devices such as the radar warning detector and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal 70 which enables certain built in test functions to be performed when the aircraft is on the ground. These built in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when an appropriate signal is received from any one or more of the subsystem sensors, such as the radar warning receiver.

Figure 3:
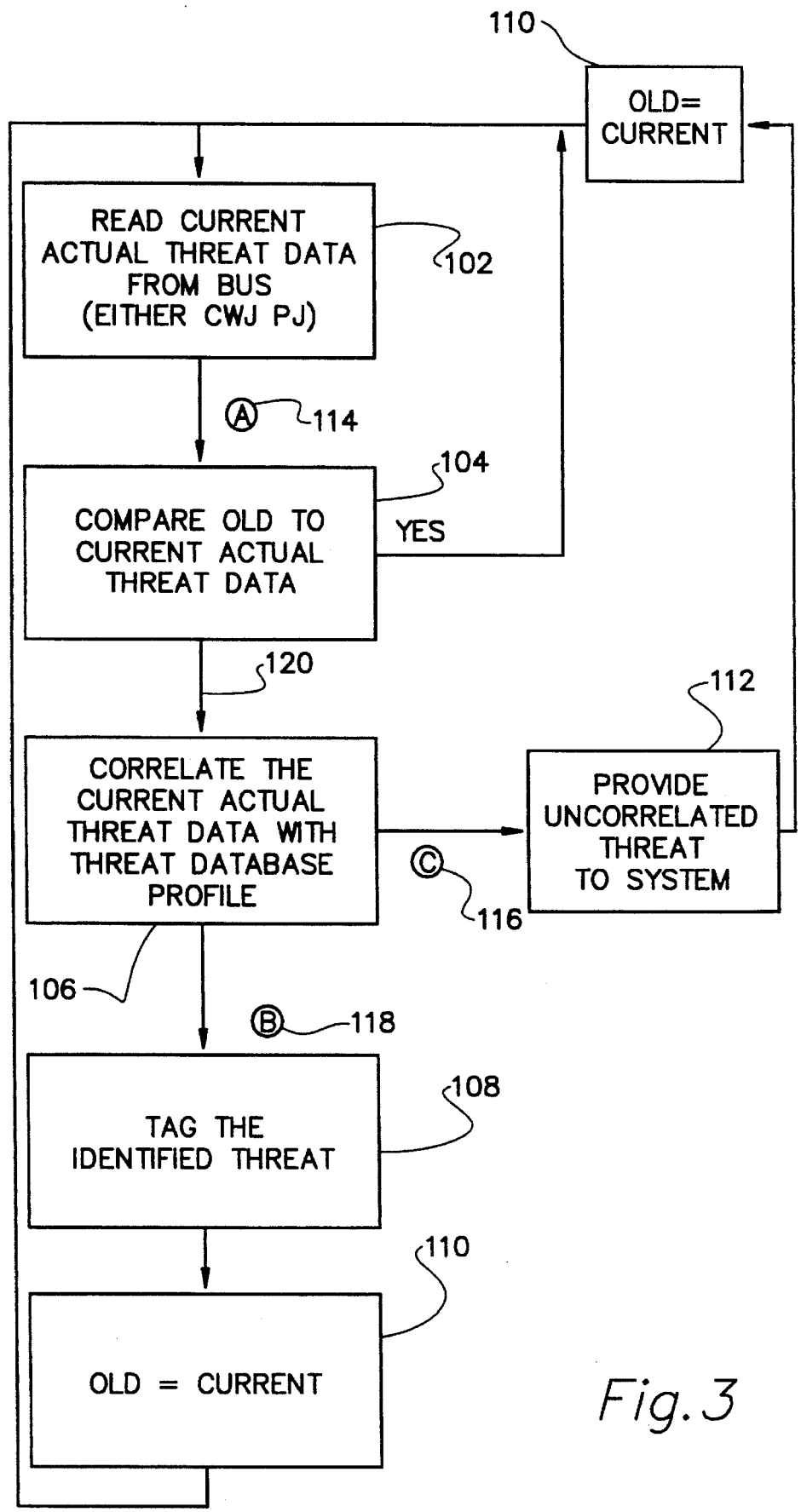
FIG. 3 shows a method of the invention that is used to convert the current actual threat data, that is sent to the system bus from either the continuous wave radar jammer or the pulsed radar jammer, to either an uncorrelated threat or an identified threat.

Now referring to FIG. 3 which shows the method of the invention used to convert current actual threat data from the system data bus from either the continuous wave radar jammer or the pulsed radar jammer to either an uncorrelated threat or an identified threat. The threat data base comprises a number of subelements and parameters. A threat data base may be input into the system and stored in memory by any well known means. The threat data base advantageously contains threat parameters including threat types which include, in one preferred embodiment of the invention, a missile, antiaircraft gunfire, a fighter, or other threats identified by the aircraft. Each threat type has an associated set of parameters which, in one preferred embodiment of the invention, include frequency of the threat signal, amplitude of the threat signal, pulsed repetition frequency, pulsed repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

Figure 5:
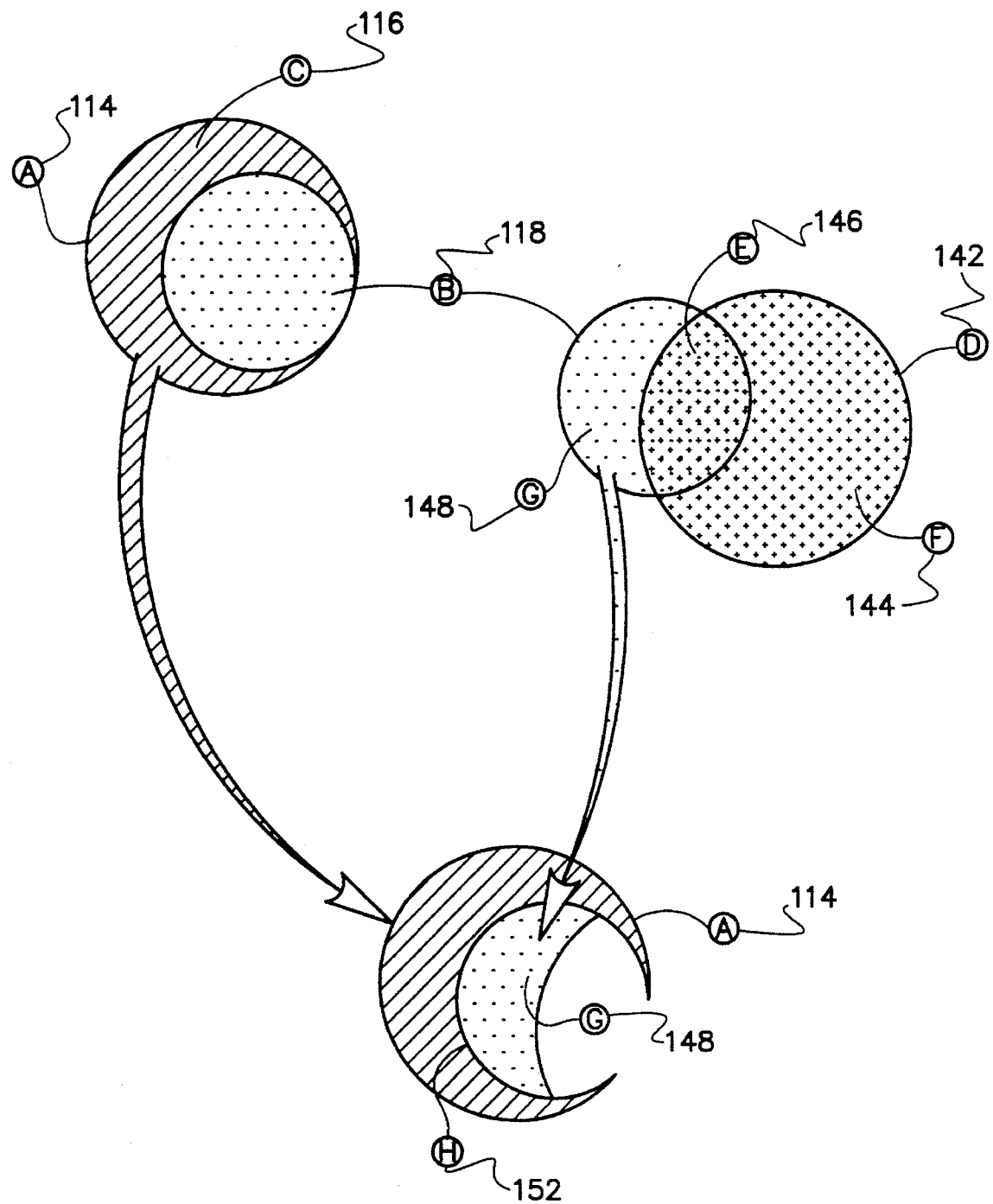
FIG. 5 shows a data flow diagram showing the various data sets of the invention in a Venn diagram fashion.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwired connections 58, 60 and from the radar jammers 34, 36. Those skilled in the art will recognize that the bus method of communication provides more robust threats. The process flows to step 104 where previously received old threat data is compared to just received current actual threat data. Step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 114. Utilizing the method of the present invention, the processor creates different sets of data which are correlated as shown in FIG. 5. At step 102, the process takes data from one of the radar jammers which is designated as data set A 114. In step 106, a data set labeled C 116 is generated which represents an uncorrelated current actual jammer threat data. This data is presented to process step 112 to provide uncorrelated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process step 104 the comparison to check old threat data against current threat data results in the old and the current being the same, then the process flows to step 102 to read the next current actual threat data from the bus or from the hardwired system.

Figure 4:
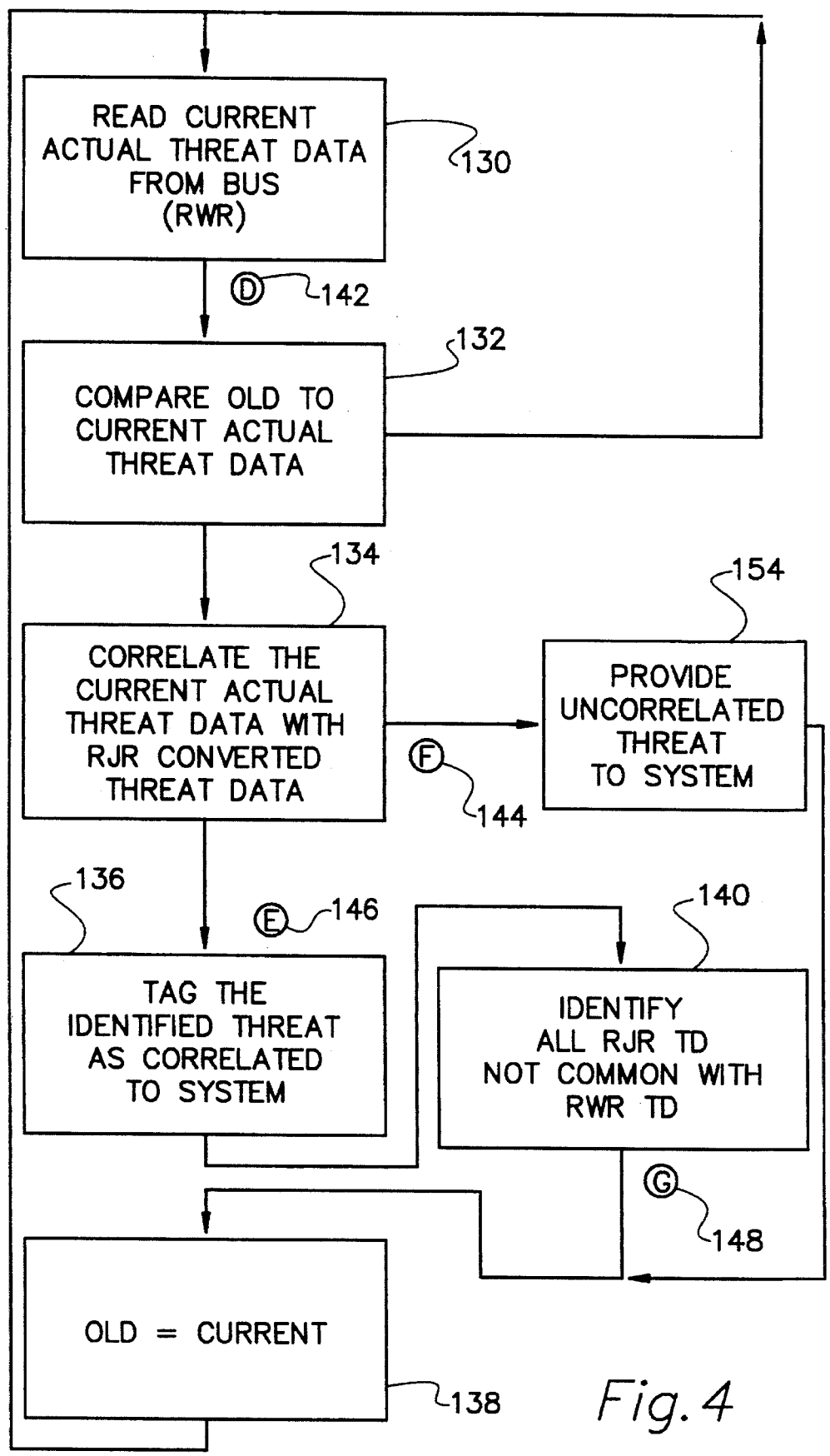
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. Process step 130 generates data set D. Data set D is then used by process step 132 to compare the current actual threat data with old threat data from the radar warning receiver. If the two threats are identical (i.e. the old and the current in step 132), the process returns to step 130 to read another actual threat. Step 103 reads in all available threats from the radar warning receiver. The set of all possible threats is commonly known as a threat set. In step 132, the old threat set is compared against a current actual threat set data. If the current actual threat set data is not a new threat set, then the process flows to step 130 to scan another set of threats. In step 132, if there is a new threat, the process flows to step 134 to correlate the current actual threat set with the radar jamming receiver converted at threat data which is generated in FIG. 3. The threat data is indicated by set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to step 130 to read the next current actual threat data set from the bus.

If in step 134 there is no correlation between the current actual threat data set with the radar jamming receiver converted threat data set, the process flows to step 154, generates an uncorrelated threat set F 144, and provides the uncorrelated threat set to the system using the method of the invention.

As is the case with the jammer data, when implementing the method of the invention to convert the current actual threat data set from the radar warning receiver to either a correlated or uncorrelated threat, the process creates various other data sets. Data set D 142 is the current active threat data set from the bus. Data set E 146 is the correlated current actual threat data with the radar jamming receiver converted threat data. Data set F 144 is the uncorrelated data. Data set G is the data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the uncorrelated actual jammer threat data. Data set D 142 is current actual radar warning receiver threat data. Data set E 146 is the common current threat data. Data set F 144 is the uncorrelated radar warning receiver threat data. Data set G 148 is the radar jamming receiver threat data which is not common with the radar warning receiver threat data. Data set G is used subsequently to generate a complementary threat set H 152. Data set H 152 is the complementary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complimentary threat. The data set B 118 is subtracted from data set A 114 to generate data set C 116 which is the uncorrelated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H which is called the complementary threat data. The complementary threat data set H comprises threats that are complementary to the already identified threats which have been identified by the radar warning receiver.

The threat data provided by the Pulsed Radar Jammer and CW radar jammer will be correlated and sorted, and prioritized before generating threat symbols for display. These threats are either unique to the Pulsed Radar Jammer and CW radar jammer or unseen by the Radar Warning Receiver. The display of these new and discriminated threats will improve the threat situation awareness in the cockpit and increases the likelihood of aircraft survivability.

Figure 6:
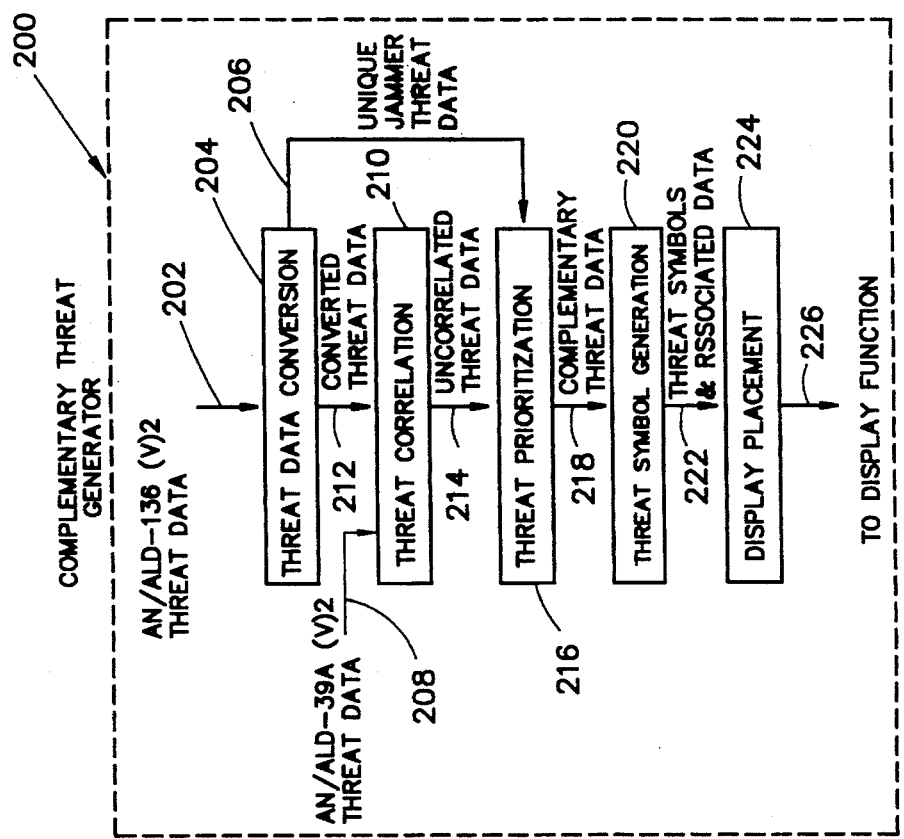
FIG. 6 shows a schematic block diagram used to show complementary threats.

Now referring to FIG. 6 which shows a schematic diagram for apparatus implementing the complementary threat generator of the invention. The threat data is provided on signal line 202 to the threat data conversion apparatus 204. Unique jammer threat data 206 is provided to a threat prioritization apparatus 216. The threat data conversion apparatus 204 provides converted threat data 212 to a threat correlation apparatus 210. Radar warning receiver threat data 208 is also provided to the threat correlation apparatus 210. Uncorrelated threat data 214 is provided to a threat prioritization apparatus 216 which prioritizes threats according to predetermined criteria. The complementary threat data 218 is provided from the threat prioritization apparatus 216. The complementary threat data 218 is provided to a threat symbol generator 220. The threat symbol generator provides threat symbols and associated data for each symbol to the multifunction display placement apparatus 224. The threat symbols and associated data is provided to the multifunction display on signal line 226.

Figure 7:
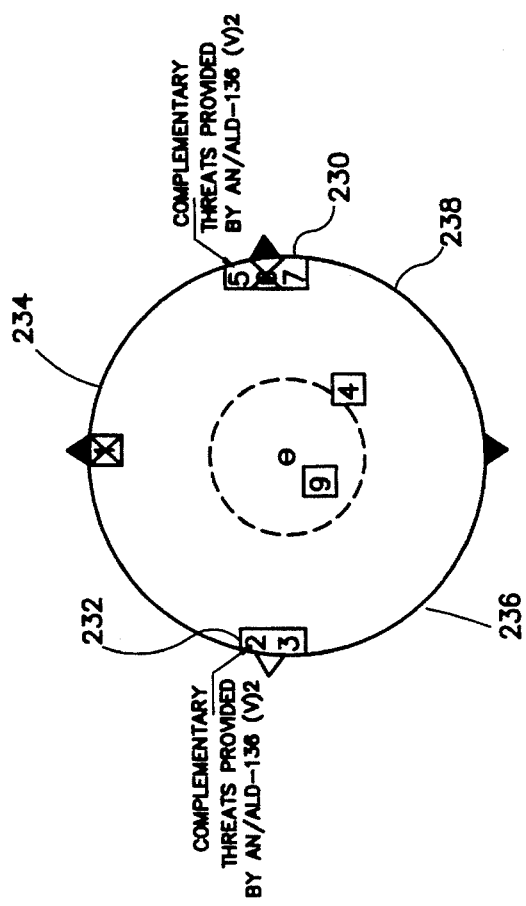
FIG. 7 shows a schematic diagram of the threat display.

Now referring to FIG. 7 which shows the display format for the complementary threats on a multifunction display. The method of the invention takes the threat data provided by the Pulsed Radar Jammer and correlates this threat data with the threat data provided by the Radar Warning Receiver. The purpose of correlation is to identify the common threats identified by these two sensors. Threats that are "unique" to the Pulsed Radar Jammer and CW Radar Jammer or unseen by the Radar Warning Receiver will be displayed as complementary threats; this will improve situation awareness in the cockpit. Improved situation awareness translates to increased aircraft survivability.

In FIG. 7, the complementary threats 2 and 3 are placed inside a window 232 and placed on the left edge 236 of the threat display circle 234. These threats are contributed by the left side antenna. In the same figure, complementary threats 5, 6, and 7 are inside a window 230 and on the right edge 238 of the display circle 234. These symbols represent threats seen by the right side antenna. These threats are seen by the pulsed radar jammer but not the radar warning receiver.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A complementary threat display apparatus comprising:
   pulsed radar jammer means having a pulsed radar jammer threat data output;
   continuous wave radar jammer means having a continuous wave radar jammer threat data output;
   threat data conversion means having an input connected to the pulsed radar jammer threat data output and the continuous wave radar jammer threat data output for converting threat data having a converted threat data output and a unique jammer threat data output;
   radar warning receiver having a radar warning receiver data output;
   threat correlation means having an input connected to the radar warning receiver output and a second threat input connected to the convened threat data output wherein the threat correlation means has an uncorrelated threat data output;
   threat prioritization means for prioritizing threat data having an uncorrelated threat data input connected to the uncorrelated threat data output and a unique jammer threat data input connected to the unique jammer threat data output having a complementary threat data output;
   threat symbol generation means having a threat symbol and associated data output having a complementary threat data input connected to the complementary threat data output; and
   display placement means connected to receive the threat symbol and associated data output, the display placement means having a display output.

2. The complementary threat display apparatus of claim 1 wherein the display placement output carries display data to a multifunction display in an aircraft survivability equipment system.

3. An integrated aircraft survivability apparatus comprising:
   (a) data bus means having a data bus control input;
   (b) means for aircraft survivability integration having a decoy dispenser control output, a complementary threat display output, a data bus control output connected to the data bus control input, a radar warning receiver control output, a pulsed radar jammer control output, a continuous wave radar jammer control output, and a missile approach detector control output;
   (c) radar warning receiver means connected to the data bus means and having a radar warning receiver control input connected to the radar warning receiver control output;
   (d) pulsed radar jammer means connected to the data bus means having a pulsed radar jammer control input connected to the pulsed radar jammer control output;
   (e) continuous wave radar jammer means connected to the data bus means having a continuous wave radar jammer control input connected to the continuous wave radar jammer control output;
   (f) missile approach detector means connected to the data bus means having a missile approach detector control input connected to the missile approach detector control output;
   (g) a complementary threat display means having a complementary threat display input connected to the complementary threat display output, the complementary threat display means further connected to a keyboard control unit; and
   (h) decoy dispenser means having an decoy dispenser input connected to the decoy dispenser control output.

4. The integrated aircraft survivability apparatus of claim 3 wherein the complementary threat display means further comprises:
   threat data conversion means for generating at least one uncorrelated threat in a threat data base;
   threat prioritization means for prioritizing the at least one uncorrelated threat;
   threat symbol generator means for generating symbols for each at least one threat; and
   threat placement means connected to said threat symbol generator means for placing a symbol representing the at least one threat on a display.

5. The integrated aircraft survivability apparatus of claim 4 wherein the at least one threat is generated by the radar warning receiver means.

6. The integrated aircraft survivability apparatus of claim 4 wherein the at least one threat is generated by the pulsed radar jammer means.

7. The integrated aircraft survivability apparatus of claim 4 wherein the at least one threat is generated by the continuous wave radar jammer means.

8. The integrated aircraft survivability apparatus of claim 4 wherein the at least one threat is generated by the missile approach detector means.

9. The integrated aircraft survivability apparatus of claim 4 wherein a pulsed radar warning receiver provides threat data to a threat data conversion means wherein the conversion means provides unique jammer threat data to the threat prioritization means.

10. The integrated aircraft survivability apparatus of claim 4 wherein a continuous wave radar warning receiver provides threat data to a threat data conversion means wherein the conversion means provides unique jammer threat data to the threat prioritization means.

11. A complementary threat generation and display apparatus, comprising:
    a radar warning receiver means for detecting a plurality of threats, having a radar warning receiver output;
    a second threat sensing means also for detecting a plurality of threats, having a second threat sensor output;
    a threat database containing a plurality of known threat profiles;
    threat data conversion and correlation means attached to the a radar warning receiver output and the second threat sensor output for generating at least one uncorrelated wherein the uncorrelated threat is not detected by both the radar warning receiver means and the second threat sensing means, nor is the uncorrelated threat contained within the threat database;
    threat prioritization means for prioritizing the at least one uncorrelated threat;
    threat symbol generator means for generating symbols for each at least one threat; and
    threat placement means connected to said threat symbol generator means for placing a symbol representing the at least one threat on a display.

12. The complementary threat generation and display apparatus of claim 11 wherein the second threat sensing means is a pulsed radar jammer means.

13. The complementary threat generation and display apparatus of claim 11 wherein the second threat sensing means is a continuous wave radar jammer means.

14. The complementary threat generation and display apparatus of claim 11 wherein the second threat sensing means is a missile approach detector means.

* * * * *